United States Patent
Gong

(10) Patent No.: US 11,080,683 B2
(45) Date of Patent: Aug. 3, 2021

(54) DOI DISPLAY AND TRANSACTION INFORMATION VERIFICATION

(71) Applicant: Advanced New Technologies Co., Ltd., Grand Cayman (KY)

(72) Inventor: Tianqi Gong, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 52 days.

(21) Appl. No.: 16/809,391

(22) Filed: Mar. 4, 2020

(65) Prior Publication Data
US 2020/0202326 A1 Jun. 25, 2020

Related U.S. Application Data

(63) Continuation of application No. PCT/CN2018/111555, filed on Oct. 24, 2018.

(30) Foreign Application Priority Data

Dec. 13, 2017 (CN) .......................... 201711328307.4

(51) Int. Cl.
G06Q 20/32 (2012.01)
G06Q 20/20 (2012.01)
G06Q 20/40 (2012.01)

(52) U.S. Cl.
CPC ....... G06Q 20/3274 (2013.01); G06Q 20/204 (2013.01); G06Q 20/3223 (2013.01); G06Q 20/4014 (2013.01)

(58) Field of Classification Search
USPC ....................................................... 705/35–45
See application file for complete search history.

(56) References Cited

U.S. PATENT DOCUMENTS

| | | | |
|---|---|---|---|
| 9,824,530 B2 | 11/2017 | Cage et al. | |
| 2014/0372288 A1* | 12/2014 | Hamblet | G06Q 20/10 705/39 |
| 2016/0314470 A1* | 10/2016 | Lai | G06F 21/50 |
| 2017/0200161 A1* | 7/2017 | Tien | G06Q 20/3829 |

FOREIGN PATENT DOCUMENTS

| | | |
|---|---|---|
| CN | 104679525 | 6/2015 |
| CN | 104932937 | 9/2015 |
| CN | 105427416 | 3/2016 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.

(Continued)

*Primary Examiner* — Robert R Niquette
(74) *Attorney, Agent, or Firm* — Fish & Richardson P.C.

(57) ABSTRACT

One or more implementations of the present specification provide a digital object unique identifier (DOI) display method for transaction information verification. When a client application starts, it is determined that a startup mode is a cold start. In response to determining that the startup mode is the cold start, a start page is displayed. The start page includes a payment digital object unique identifier (DOI) to be scanned by a scanner to make a payment by scanning the payment DOI.

24 Claims, 5 Drawing Sheets

1. On the mobile phone desktop, touch an application
2. Enter a start page and wait for rendering
3. Select "Pay" on the application content page
4. Display a payment code

(56) References Cited

FOREIGN PATENT DOCUMENTS

| | | |
|---|---|---|
| CN | 106296172 | 1/2017 |
| CN | 106326710 | 1/2017 |
| CN | 106445363 | 2/2017 |
| CN | 106875178 | 6/2017 |
| CN | 107016420 | 8/2017 |
| CN | 107403312 | 11/2017 |
| CN | 108197930 | 6/2018 |
| TW | 201305914 | 2/2013 |
| TW | 201727549 | 12/2016 |
| TW | M550433 | 10/2017 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln. No. PCT/CN2018/111555, dated Jan. 21, 2019, 9 pages (with partial English translation).
PCT International Preliminary Report on Patentability in International Appln No. PCT/CN2018/111555, dated Jun. 16, 2020, 11 pages (with English translation).

* cited by examiner

DOI DISPLAY AND TRANSACTION INFORMATION VERIFICATION

CROSS-REFERENCE TO RELATED APPLICATIONS

This application is a continuation of PCT Application No. PCT/CN2018/111555, filed on Oct. 24, 2018, which claims priority to Chinese Patent Application No. 201711328307.4, filed on Dec. 13, 2017, and each application is hereby incorporated by reference in its entirety.

TECHNICAL FIELD

The present specification relates to the field of computer technologies, and in particular, to a digital object unique identifier (DOI) display method and transaction information verification method, device and equipment.

BACKGROUND

With the popularization of mobile payment, the use of code scanning payment is becoming increasingly wider.

In the existing technology, when users need to provide payment codes to make mobile payment in places such as supermarkets or convenience stores, especially when the payment client is cold started (that is, when starting application starts, the back end does not have a process for the application, and the system recreates at least one new process for the application, this startup mode is called cold start), the users need to wait for a terminal to render the client. After rendering, the users select "Pay" to display the payment code for paying.

As such, a more convenient DOI display scheme is needed.

SUMMARY

Implementations of the present specification provide a service experience implementation method, equipment and device to alleviate the problem that a more convenient DOI display method is needed.

Based on this, an implementation of the present specification provides a DOI display method, including: determining, when a client starts, whether a current startup mode is cold start; and if yes, displaying a start page containing a payment DOI to make payment by using a scanner to scan the payment DOI.

In addition, an implementation of the present specification further provides a transaction information verification method, including: receiving, by a server, transaction information generated by a scanner after scanning a payment DOI, where the payment DOI is included and displayed on a start page of a client; determining a corresponding verification method for a payment user based on verification identifier information in the payment DOI included in the transaction information; and performing verification by using the determined verification method, and determining, based on a verification result, whether to deduct money.

In addition, an implementation of the present specification further provides a DOI display equipment, including: a determining module, configured to determine, when a client starts, whether a current startup mode is cold start; and a display module, configured to display a start page containing a payment DOI to make payment by using a scanner to scan the payment DOI.

In addition, an implementation of the present specification further provides a transaction information verification equipment, including: a receiving module, configured to receive transaction information generated by a scanner after scanning a payment DOI, where the payment DOI is included and displayed on a start page of a client; a determining module, configured to determine a corresponding verification method for a payment user based on verification identifier information in the payment DOI included in the transaction information; and a verification module, configured to perform verification by using the determined verification method, and determine, based on a verification result, whether to deduct money.

Correspondingly, an implementation of the present specification further provides a DOI display device, where the device includes a memory, configured to store a DOI display program; and a processor, configured to invoke and execute the DOI display program in the memory to: determine, when a client starts, whether a current startup mode is cold start; and if yes, display a start page containing a payment DOI to make payment by using a scanner to scan the payment DOI.

Correspondingly, an implementation of the present specification further provides a transaction information verification device, including: a memory, configured to store a transaction information verification program; and a processor, configured to invoke and execute the transaction information verification program in the memory to: receive transaction information generated by a scanner after scanning a payment DOI, where the payment DOI is included and displayed on a start page of a client; determine a corresponding verification method for a payment user based on verification identifier information in the payment DOI included in the transaction information; and perform verification by using the determined verification method, and determine, based on a verification result, whether to deduct money.

Correspondingly, an implementation of the present specification further provides a non-volatile computer storage medium that stores a computer executable instruction, where the computer executable instruction is set to determine, when a client starts, whether a current start mode is cold start; and if yes, display a start page containing a payment DOI to make payment by using a scanner to scan the payment DOI.

Correspondingly, an implementation of the present specification further provides another non-volatile computer storage medium that stores a computer executable instruction, where the computer executable instruction is set to receive transaction information generated by a scanner after scanning a payment DOI, where the payment DOI is included and displayed on a start page of a client; determine a corresponding verification method for a payment user based on verification identifier information in the payment DOI included in the transaction information; and perform verification by using the determined verification method, and determine, based on a verification result, whether to deduct money.

The at least one of the above technical solutions adopted in the implementations of the present specification can achieve beneficial effects of directly displaying a start page containing a DOI when it is determined that a client is cold started. Users can pay through the DOI included on the start page. In other words, the users do not need to wait for the client to enter a content page and perform rendering, and can touch "Pay" to trigger a terminal to display the DOI, which improves the convenience of DOI display.

DESCRIPTION OF IMPLEMENTATIONS

To make the objectives, technical solutions, and advantages of the display application clearer, the following clearly and comprehensively describes the technical solutions of the display application with reference to specific implementations and accompanying drawings of the display application. Apparently, the described implementations are merely some rather than all of the implementations of the display application. All other implementations obtained by a person of ordinary skill in the art based on the implementations of the present specification without creative efforts shall fall within the protection scope of the display application.

First, it is worthwhile to note that the startup mode of a client can include cold start or hot start. Cold start is: When an application starts, the backend does not have a process for the application, and the system recreates at least one new process for the application, this mode is called cold start. Correspondingly, hot start is that when an application starts, the backend already has a process for the application (for example, the application can exit when the back key or the home key is touched, but the process of the application is still in the backend and can be viewed in the task list). When there is an existing process, the application can be started from the existing process, and this mode is called hot start. It is easy to understand that cold start consumes more system resources and starts more slowly than hot start.

Figure 1:
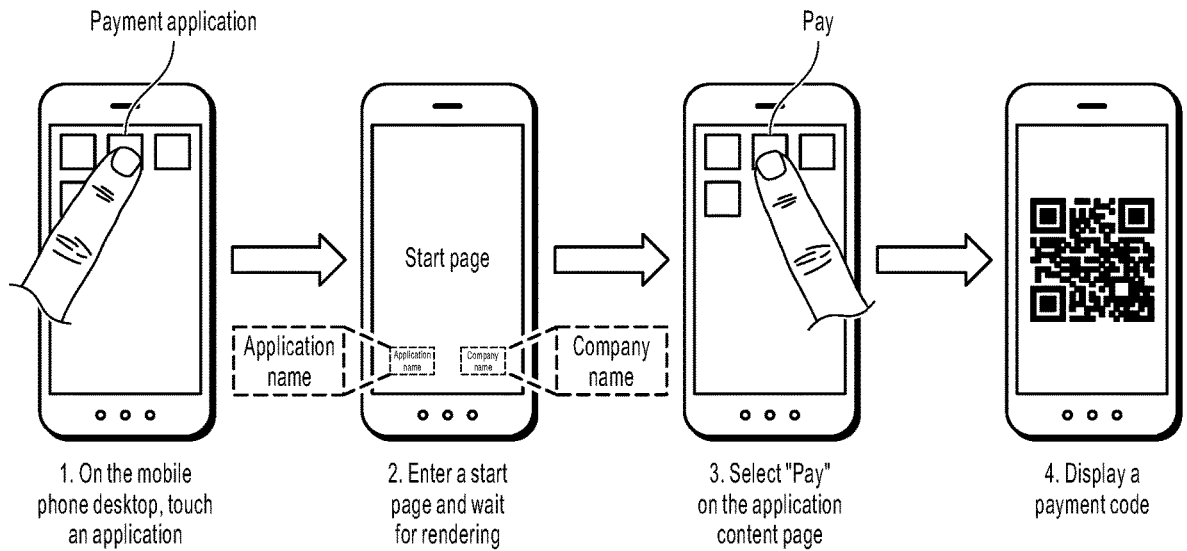
FIG. 1 is a schematic diagram illustrating steps performed by a user operating a mobile phone to display a two-dimensional code in the existing technology.

FIG. 1 is a schematic diagram illustrating steps performed by a user operating a mobile phone to display a two-dimensional code in the existing technology. As shown in FIG. 1, a user often needs to operate the mobile phone to experience the following steps when needs to pay. 1. Touch a payment application; 2. Wait for the mobile phone to start a client and display a start page; 3. Enter the page of the client and render; 4. Touch the "Pay" button in the interface of the client to trigger the mobile phone to display a two-dimensional code in the interface of the client.

Each of these steps consumes time of the user, especially step 2 and step 3. It often takes a long time for the mobile phone to start the client and render the interface of the client. For the mobile phone with low performance, it takes longer time to start the application and render the interface. Especially when cold start is used to start the payment application, there can even be a failure to render the interface. In this case, the mobile phone can be in the state of displaying the start page for a long time, thereby causing troubles to the user who needs to pay.

In the implementations provided in the present specification, a start page containing a DOI is directly displayed when it is determined that the client is cold started. The user can pay through the DOI included on the start page. Thus even if the start page is frozen because of poor phone performance, the mobile phone can still display the DOI in time for transactions. This is more convenient for use.

The technical solutions provided in the implementations of the present specification are described in detail below with reference to the accompanying drawings.

Figure 2:
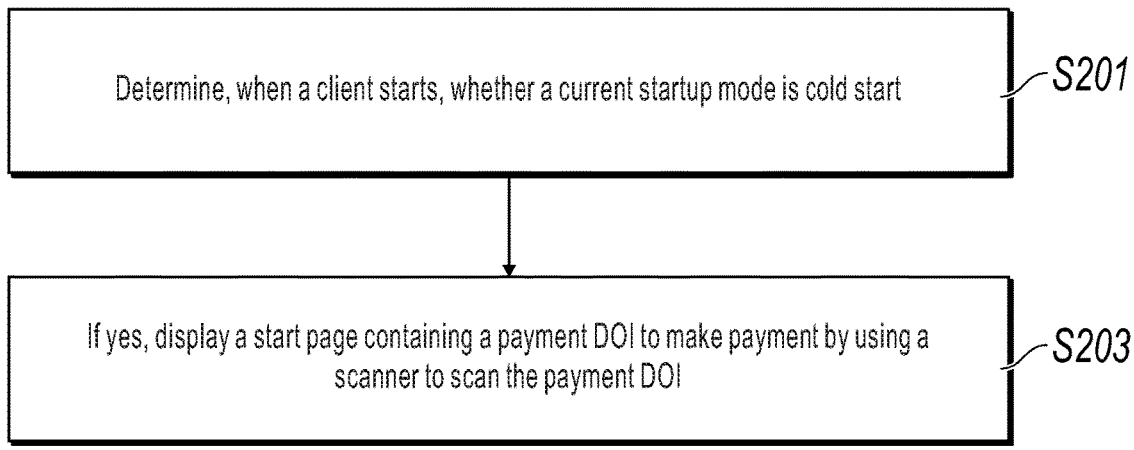
FIG. 2 is a schematic flowchart illustrating a DOI display method, according to an implementation of the present specification.

FIG. 2 is a schematic flowchart illustrating a DOI display method, according to an implementation of the present specification. As shown in FIG. 2, the DOI display method includes the following steps:

S201. Determine, when a client starts, whether a current startup mode is cold start.

As previously described, there can be multiple ways to distinguish cold start and hot start based on the differences. For example, by detecting whether a process corresponding to a payment application is newly created.

S203. If the current startup mode is cold start, display a start page containing a payment DOI to make payment by using a scanner to scan the payment DOI.

The DOI mentioned in the implementation of the present specification can be a DOI, such as a barcode, a two-dimensional code, etc. that corresponds to a payment user identifier (such as a mobile phone number, a user account, etc.). That is, the scanner can obtain a number string by scanning the DOI, and a server can obtain a corresponding payer ID by parsing the number string. Certainly, other information can be included in the number string, for example, information used to indicate a two-dimensional code category (or transaction information category).

The start page is also referred to as a start screen. For some applications that take a lot of time to initialize (for example, pull data from the network to fill in the home page) when start, some pages can be prepared during this period (the length of this period can also be predetermined) and displayed to a user, to avoid displaying a blank page to the user.

Figure 3:
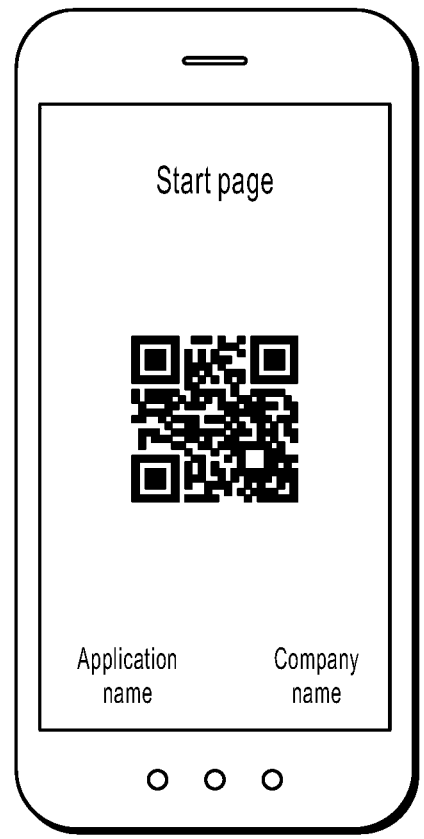
FIG. 3 is a start page containing a payment DOI, according to an implementation of the present specification.

In the present specification, the start page containing the payment DOI can be generated by combining the payment DOI with the previous start page. A combination method can be determined based on actual cases (for example, placing the payment DOI in the middle of the start page). The generation method can be pre-generated and stored for invoking, or can be generated as soon as the client is cold started. FIG. 3 is a start page containing a payment DOI, according to an implementation of the present specification.

It is easy to understand that if it is detected that a current startup mode of a client is hot start, a user can touch "Pay" to generate a two-dimensional code to make conventional payment without displaying the previous start page because hot start can quickly display a content page of the client.

The start page containing the payment DOI is displayed directly when it is detected that the client is cold started. The user can pay through the payment DOI included on the start page. In other words, the user does not need to wait for the client to enter a content page and perform rendering, and can touch "Pay" to trigger a terminal to display the payment DOI, which improves the convenience of payment DOI display.

The payment code display method provided in the implementation of the present specification differs from the method that the client is normally logged in to generate a payment code. When payment is made using the two-dimensional code in the previous start page, a server needs to perform specific processing on transaction information containing the two-dimensional code information (for example, the scheme provided in the present specification is referred to as quick payment code payment, and is processed differently from the conventional payment). In the conventional payment scheme, login verification is needed. If the payment code provided in the present specification is used for transaction, login-free verification can be performed on the server.

To achieve this, the previous payment scheme provided in the present specification can be implemented in the following method: The payment DOI includes verification identifier information, and the verification identifier information is used by the server to determine a verification method for transaction information generated by a scanner after scanning the payment DOI. That is, a verification identifier is directly added at the time of generating the two-dimensional code, so parsed content of the two-dimensional code includes the verification identifier. The server can directly obtain the category of the transaction information to enter a quick payment code payment procedure (in this procedure, perform login-free verification on the payer). Or the content corresponding to the two-dimensional code can be identified by the server to generate category information (for example, a specific algorithm is used at the time of generating the two-dimensional code, and the server parses the corresponding specified algorithm to obtain the category information), and the category information is used to determine the category of the transaction information. Therefore, payment security can be improved by entering different transaction verification procedures based on different two-dimensional codes provided by the user.

In step S203, displaying the start page containing the payment DOI can locally invoke a pre-generated start page containing a payment two-dimensional code, or generate a temporary start page. The specific method is as follows:

The client pre-generates the start page containing the payment DOI in a previous running process, and displays the pre-generated start page containing the payment DOI when the client is cold started. For example, a two-dimensional code for quick payment is generated and a start page is obtained when the client is running normally. Then the code and the start page are combined to obtain the start page containing the DOI (that is, the two-dimensional code for quick payment), and the start page is locally stored for invoking when the client is cold started next time.

Or when the client is cold started, the client locally generates a two-dimensional code for quick payment and obtains a start page that does not include the payment DOI. Then the client generates and displays the start page containing the payment DOI based on the two-dimensional code for quick payment and the start page that does not include the payment DOI.

In a specific implementation, when the two-dimensional code for quick payment is generated locally, local random factors (for example, local time or system time) can be used to generate the DOI in combination with payment user identifier information. Using the local random factors to generate payment information can improve security. For example, a payment code can be generated based on a payment user ID and local time, and the payment code can be a character string used to generate a two-dimensional code for payment. A merchant can obtain a corresponding payment code by scanning the two-dimensional code for payment, and the server can obtain the payment user ID through parsing the received payment code.

When the payment code is generated in combination with the payment user identifier information, because the scheme provided in the implementation of the present specification bypasses the login step, the user identifier used to recently log in to the client can be selected as the payment user identifier to generate the two-dimensional code for payment in combination with the local time.

Verification could fails, resulting in a payment failure. Therefore, in practice, after the client starts, the scheme further includes: determining whether a prompt message indicating a payment failure is received from the server; and if yes, displaying a service page containing the payment DOI, where the service page is not the start page. That is, if money deduction fails by using the scheme provided in the present specification, a payment page can be automatically opened after the client has fully started to generate a two-dimensional code for conventional payment.

In a specific implementation, in the previous scheme provided in the implementation of the present specification, the payment DOI is a two-dimensional code.

Correspondingly, an implementation of the present specification further provides a transaction information verification method, including: receiving, by a server, transaction information generated by a scanner after scanning a payment DOI, where the payment DOI is included and displayed on a start page of a client; determining a corresponding verification method for a payment user based on verification identifier information in the payment DOI included in the transaction information; and performing verification by using the determined verification method, and determining, based on a verification result, whether to deduct money.

In practice, a merchant receives and parses a two-dimensional code displayed by a user to obtain a corresponding payment code (the payment code can includes a payment user identifier, or verification identifier information used to indicate whether the two-dimensional code is a two-dimensional code quick payment or a conventional two-dimensional code), generates transaction information that includes relevant content in combination with consumption of the user, and sends the transaction information to the server. After receiving the transaction information sent by the merchant, the server parses the relevant content to obtain the verification identifier. The server determines a payment processing channel of this transaction based on the verification identifier and performs different verification processing procedures. Deduction can only be made after the verification succeeds.

Specifically, login-free verification or login verification is performed on the payment user based on the verification identifier information. The login-free verification is to verify a payer included in the transaction information when the user is in a login-free state.

At least one of historical login behavior data (such as historical login time or recent login time) or historical login environment data (historical login location, device number, login network line, etc.) is obtained based on the user identifier of the payment user during login-free verification; and login-free verification is performed on the payment user based on at least one of the historical login behavior data or the historical login environment data.

The login verification is usually performed for a conventional transaction information scheme. For the scheme provided in the present specification, the login-free verification can also be performed before payment to determine whether the user is in the login-free state. If the user is in the login state (in the login state, the user can make payment by using the conventional method), it can be determined that this situation is unreasonable and someone stoles account of the user. Then the current transaction is rejected and payment failure information is fed back to the client. If the user is in the login-free state, the transaction information is considered reasonable and the payment is made. In addition, after payment is made, the transaction information is sent to the client of the user so the transaction information can be received later when the user logs in to the client. In addition, the two-dimensional code (including the two-dimensional code that requires login-free verification identifier) in the previous scheme can also be printed for payment as that in the conventional payment scheme. Certainly, in this case, login-free verification also needs to be performed for the current quick transaction on the server.

To make the scheme securer, functional settings can also be made in the client. For example, the user needs to manually enable a quick payment code function to execute the scheme provided in the implementation of the present specification. In addition, a more strict money limitation (for example, no more than 50 yuan per time, no more than 300 yuan per day, etc.) can be set, which is closer to a practical scenario.

Figure 4:
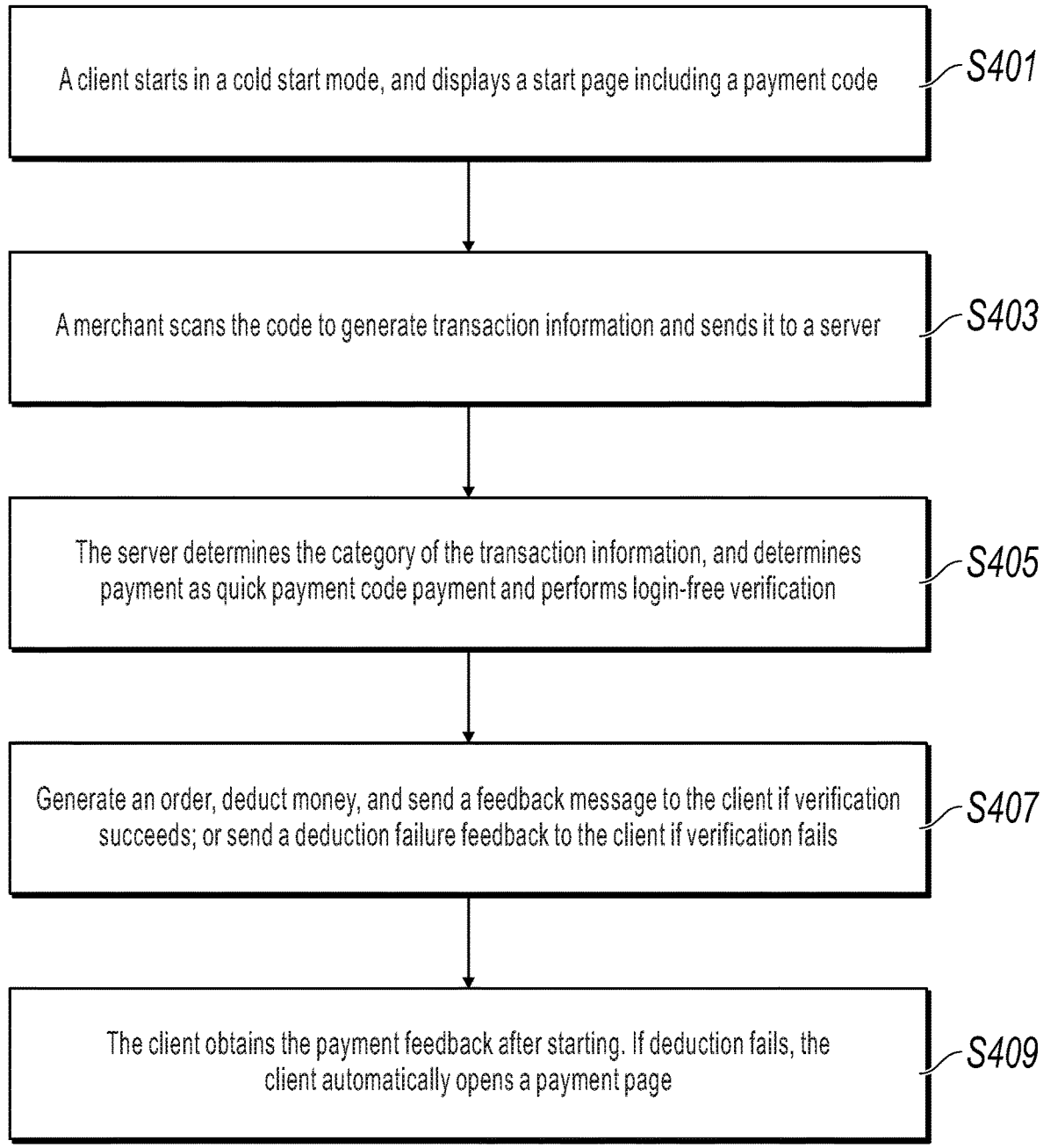
FIG. 4 is a schematic flowchart illustrating a transaction process using a quick payment code, according to an implementation of the present specification.

In a specific usage scenario, the client displays a payment start page, and the server completes security verification and deduction and feeds back a message to the user. FIG. 4 is a schematic flowchart illustrating a transaction process using a quick payment code, according to an implementation of the present specification. The transaction process includes the following steps:

S401. A client starts in a cold start mode, and displays a start page containing a payment code.

S403. A merchant scans the code to generate transaction information and sends it to a server.

S405. The server determines the category of the transaction information, and determines payment as quick payment code payment and performs login-free verification.

S407. Generate an order, deduct money, and send a feedback message to the client if verification succeeds; or send a deduction failure feedback to the client if verification fails.

S409. The client obtains the payment feedback after starting. If deduction fails, the client automatically opens a payment page.

Figure 5:
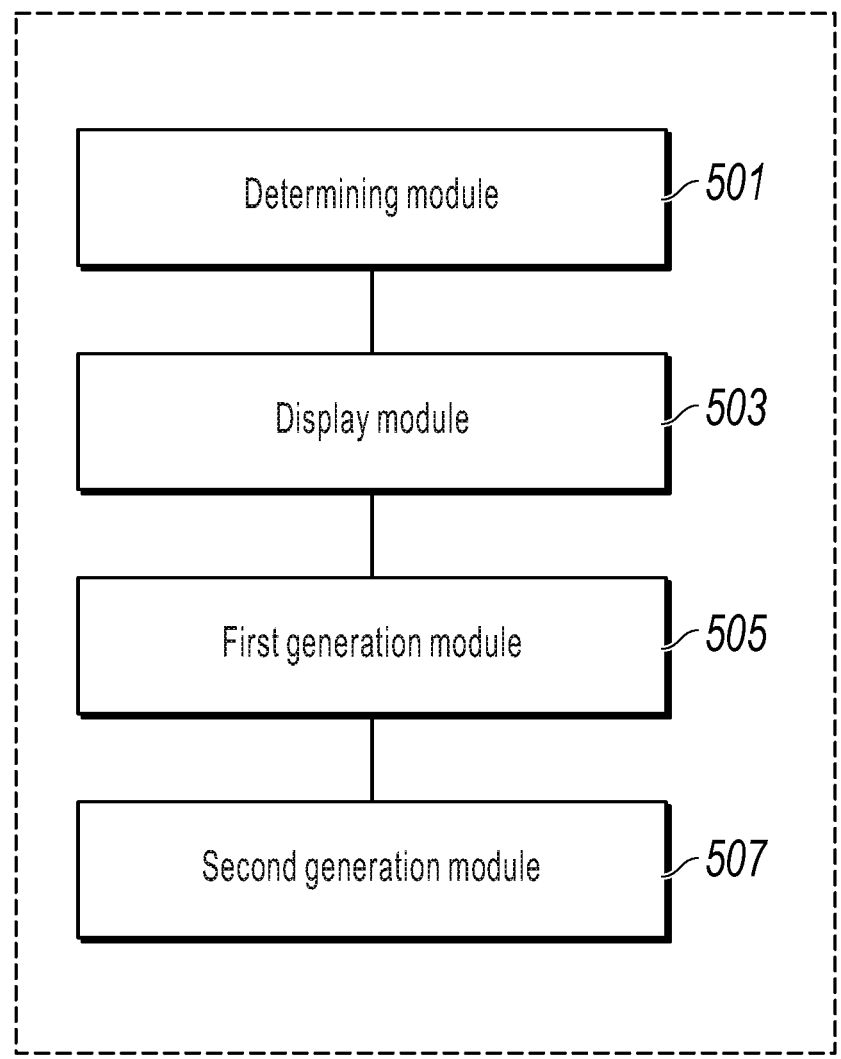
FIG. 5 is a schematic structural diagram illustrating a DOI display equipment, according to an implementation of the present specification.

Based on the same idea, the display disclosure further provides a DOI display equipment. FIG. 5 is a schematic structural diagram illustrating the DOI display equipment, according to an implementation of the present specification. The equipment includes: a determining module 501, configured to determine, when a client starts, whether a current startup mode is cold start; and a display module 503, configured to display a start page containing a payment DOI to make payment by using a scanner to scan the payment DOI.

Further, the payment DOI includes verification identifier information, and the verification identifier information is used by a server to determine a verification method for transaction information generated by the scanner after scanning the payment DOI.

Further, the equipment further includes a first generation module 505, configured to pre-generate, in a previous running process, the start page containing the payment DOI; and the display module 503 displays the pre-generated start page containing the payment DOI.

Further, the equipment further includes a second generation module 507, configured to generate the payment DOI and obtain a start page of the client, and generate the start page containing the payment DOI based on the payment DOI and the start page that does not include the payment DOI. The display module 503 displays the start page containing the payment DOI.

Further, the second generation module 507 generates the payment DOI based on local random factors.

Further, the second generation module 507 obtains a user identifier used to log in to the client recently; and generates the payment DOI based on the local random factors and the user identifier used to log in to the client recently.

Further, after the client starts, the determining module 501 determines whether a prompt message indicating a payment failure is received from the server; and if yes, the display module 503 displays a service page containing the payment DOI, where the service page is not the start page.

Further, in the above equipment, the payment DOI is a two-dimensional code.

Figure 6:
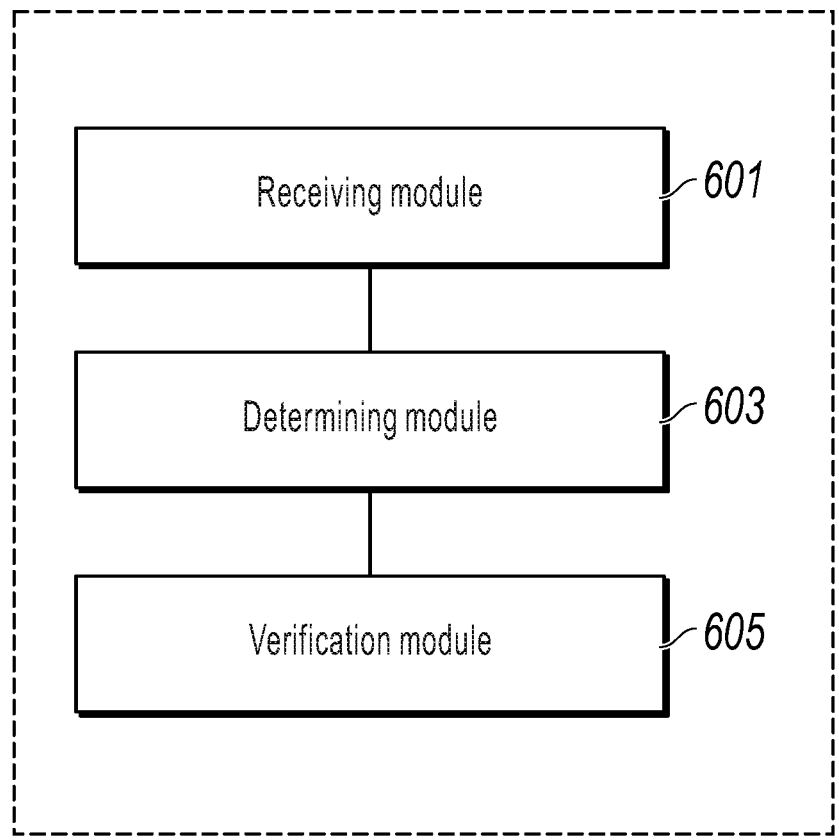
FIG. 6 is a schematic structural diagram illustrating a transaction information verification equipment, according to an implementation of the present specification.

Based on the same idea, the display disclosure further provides a transaction information verification equipment. FIG. 6 is a schematic structural diagram illustrating the transaction information verification equipment, according to an implementation of the present specification. The equipment includes: a receiving module 601, configured to receive transaction information generated by a scanner after scanning a payment DOI, where the payment DOI is included and displayed on a start page of a client; a determining module 603, configured to determine a corresponding verification method for a payment user based on verification identifier information in the payment DOI included in the transaction information; and a verification module 605, configured to perform verification by using the determined verification method, and determine, based on a verification result, whether to deduct money.

Further, the verification module 605 performs login-free verification or login verification on the payment user based on the verification identifier information.

Further, the verification module 605 obtains at least one of historical login behavior data or historical login environment data of the payment user based on a user identifier of the payment user; and performs login-free verification on the payment user based on at least one of the historical login behavior data or the historical login environment data of the payment user.

Correspondingly, an implementation of the present specification further provides a DOI display device, where the device includes a memory, configured to store a DOI display program; and a processor, configured to invoke and execute the DOI display program in the memory to: determine, when a client starts, whether a current startup mode is cold start; and if yes, display a start page containing a payment DOI to make payment by using a scanner to scan the payment DOI.

Correspondingly, an implementation of the present specification further provides a transaction information verification device, including: a memory, configured to store a transaction information verification program; and a processor, configured to invoke and execute the transaction information verification program in the memory to: receive transaction information generated by a scanner after scanning a payment DOI, where the payment DOI is included and displayed on a start page of a client; determine a corresponding verification method for a payment user based on verification identifier information in the payment DOI included in the transaction information; and perform verification by using the determined verification method, and determine, based on a verification result, whether to deduct money.

Correspondingly, an implementation of the present specification further provides a non-volatile computer storage medium that stores a computer executable instruction, where the computer executable instruction is set to determine, when a client starts, whether a current start mode is cold start; and if yes, display a start page containing a payment DOI to make payment by using a scanner to scan the payment DOI.

Correspondingly, an implementation of the present specification further provides another non-volatile computer storage medium that stores a computer executable instruction, where the computer executable instruction is set to receive transaction information generated by a scanner after scanning a payment DOI, where the payment DOI is included and displayed on a start page of a client; determine a corresponding verification method for a payment user based on verification identifier information in the payment DOI included in the transaction information; and perform verification by using the determined verification method, and determine, based on a verification result, whether to deduct money.

The implementations in the present specification are all described in a progressive method. For same or similar parts in the implementations, refer to these implementations. Each implementation focuses on a difference from other implementations. Especially, an apparatus implementation, a device implementation, a medium implementation are basically similar to a method implementation, and therefore is described briefly; for related parts, reference is made to partial descriptions in the method implementation. Details are omitted here.

Specific implementations of the present specification are described above. Other implementations fall within the scope of the appended claims. In some cases, the actions or steps or modules described in the claims can be performed in an order different from the order in the implementation and the desired results can still be achieved. In addition, the process depicted in the accompanying drawings is not necessarily shown in a particular order or a consecutive order to achieve the desired results. In some implementations, multi-tasking and parallel processing are also possible or can be advantageous.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code also needs to be written in a particular programming language for compilation. The language is referred to as a hardware description language (HDL). There are many types of HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements the logical method procedure can be readily obtained once the method procedure is logically programmed by using the several described hardware description languages and is programmed into an integrated circuit.

A controller can be implemented in any appropriate method. For example, the controller can be a microprocessor, a processor, or a computer readable medium, a logic gate, a switch, an application-specific integrated circuit (ASIC), a programmable logic controller, or a built-in microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicone Labs C8051F320. A memory controller can also be implemented as a part of control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure within the hardware component. Or the apparatus configured to implement various functions can even be considered as both a software module implementing the method and a structure within the hardware component.

The systems, apparatuses, modules, or units illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an email device, a game console, a tablet computer, or a wearable device, or a combination of any of these devices.

For ease of description, the apparatuses above are described separately in terms of their functions. Certainly, when the implementations of the present specification are implemented, the functions of each unit can be implemented in one or more pieces of at least one of software or hardware.

A person skilled in the art should understand that an implementation of the display disclosure can be provided as a method, a system, or a computer program product. Therefore, the display disclosure can use a form of hardware only implementations, software only implementations, or implementations with a combination of software and hardware. Moreover, the display disclosure can use a form of a computer program product that is implemented on one or more computer-usable storage media (including but not limited to a disk memory, a CD-ROM, an optical memory, etc.) that include computer-usable program code.

The display disclosure is described with reference to at least one of the flowcharts or block diagrams of the method, the device (system), and the computer program product based on the implementations of the display disclosure. It is worthwhile to note that computer program instructions can be used to implement at least one of each process or each block in at least one of the flowcharts or the block diagrams, and a combination of at least one of a process or a block in at least one of the flowcharts or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specified function in at least one of one or more processes in the flowcharts or one or more blocks in the block diagrams.

These computer program instructions can also be stored in a computer readable memory that can instruct the computer or the another programmable data processing device to work in a specific way, so the instructions stored in the computer readable memory generate an artifact that includes an instruction device. The instruction device implements a specified function in at least one of one or more processes in the flowcharts or one or more blocks in the block diagrams.

These computer program instructions can also be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in at least one of one or more processes in the flowcharts or one or more blocks in the block diagrams.

In a typical configuration, a computing device includes one or more central processing units (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic tape/magnetic disk memory, another magnetic storage device, or any other non-transmission medium. The computer storage medium can be used to store information that can be accessed by the computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements that are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that one or more implementations of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

The implementations of the present specification can be described in common contexts of computer executable instructions executed by a computer, such as a program module. Generally, the program module includes a routine, a program, an object, a component, a data structure, etc. executing a specific task or implementing a specific abstract data type. The implementations of the present specification can also be practiced in distributed computing environments. In these distributed computing environments, tasks are executed by remote processing devices that are connected by using a communications network. In a distributed computing environment, the program module can be located in both local and remote computer storage media including storage devices.

The implementations in the present specification are all described progressively. For same or similar parts in the implementations, refer to these implementations mutually. Each implementation focuses on a difference from other implementations. Particularly, a system implementation is basically similar to a method implementation, and therefore, is described briefly. For related parts, refer to related descriptions in the method implementation.

The previous descriptions are merely implementations of the present specification, and are not intended to limit the display application. For a person skilled in the art, the implementations of the present specification can have various modifications and changes. Any modification, equivalent replacement, or improvement made without departing from the spirit and principle of the implementations of the present specification shall fall within the protection scope of the display application.

What is claimed is:
1. A computer-implemented method, comprising:
   determining, when a client application starts in a current running process, that a startup mode is a cold start; and
   in response to determining that the startup mode is the cold start, displaying a start page comprising a payment digital object unique identifier (DOI) to be scanned by a scanner to make a payment by scanning the payment DOI,
   wherein, before determining that the startup mode is the cold start, pre-generating, by the client application in a previous running process, the start page comprising the payment DOI, and wherein displaying the start page comprising the payment DOI includes displaying the pre-generated start page comprising the payment DOI.

2. The computer-implemented method of claim 1, wherein the payment DOI comprises verification identifier information, and the verification identifier information is used by a server to determine a verification method for transaction information generated by the scanner after scanning the payment DOI.

3. The computer-implemented method of claim 1, wherein displaying the start page comprising the payment DOI comprises:
generating the payment DOI;
obtaining an initial start page of the client application that does not comprise the payment DOI; and
generating and displaying, based on the payment DOI and the initial start page that does not comprise the payment DOI, the start page comprising the payment DOI.

4. The computer-implemented method of claim 3, wherein generating the payment DOI comprises:
generating the payment DOI based on local random factors.

5. The computer-implemented method of claim 4, wherein generating the payment DOI based on the local random factors comprises:
obtaining a user identifier that is previously used to log in to the client application; and
generating the payment DOI based on the local random factors and the user identifier that is previously used to log in to the client application recently.

6. The computer-implemented method of claim 1, wherein after the client application has started, the method further comprises:
determining that a prompt message indicating that the payment has failed is received; and
in response, displaying a service page comprising the payment DOI, wherein the service page is not the start page.

7. The computer-implemented method of claim 1, wherein the payment DOI is a two-dimensional code.

8. The computer-implemented method of claim 1, further comprising:
receiving, by a server, transaction information generated by the scanner after scanning the payment DOI, wherein the payment DOI comprises verification identifier information;
determining a corresponding verification method for the transaction information based on the verification identifier information in the payment DOI;
performing a verification for the transaction information using the corresponding verification method; and
determining, based on a verification result, whether to complete the payment.

9. A non-transitory, computer-readable medium storing one or more instructions executable by a computer system to perform operations comprising:
determining, when a client application starts in a current running process, that a startup mode is a cold start; and
in response to determining that the startup mode is the cold start, displaying a start page comprising a payment digital object unique identifier (DOI) to be scanned by a scanner to make a payment by scanning the payment DOI,
wherein, before determining that the startup mode is the cold start, pre-generating, by the client application in a previous running process, the start page comprising the payment DOI, and wherein displaying the start page comprising the payment DOI includes displaying the pre-generated start page comprising the payment DOI.

10. The non-transitory, computer-readable medium of claim 9, wherein the payment DOI comprises verification identifier information, and the verification identifier information is used by a server to determine a verification method for transaction information generated by the scanner after scanning the payment DOI.

11. The non-transitory, computer-readable medium of claim 9, wherein displaying the start page comprising the payment DOI comprises:
generating the payment DOI;
obtaining an initial start page of the client application that does not comprise the payment DOI; and
generating and displaying, based on the payment DOI and the initial start page that does not comprise the payment DOI, the start page comprising the payment DOI.

12. The non-transitory, computer-readable medium of claim 11, wherein generating the payment DOI comprises:
generating the payment DOI based on local random factors.

13. The non-transitory, computer-readable medium of claim 12, wherein generating the payment DOI based on the local random factors comprises:
obtaining a user identifier that is previously used to log in to the client application; and
generating the payment DOI based on the local random factors and the user identifier that is previously used to log in to the client application recently.

14. The non-transitory, computer-readable medium of claim 9, wherein after the client application has started, the operations further comprise:
determining that a prompt message indicating that the payment has failed is received; and
in response, displaying a service page comprising the payment DOI, wherein the service page is not the start page.

15. The non-transitory, computer-readable medium of claim 9, wherein the payment DOI is a two-dimensional code.

16. The non-transitory, computer-readable medium of claim 9, where in the operations further comprise:
receiving, by a server, transaction information generated by the scanner after scanning the payment DOI, wherein the payment DOI comprises verification identifier information;
determining a corresponding verification method for the transaction information based on the verification identifier information in the payment DOI;
performing a verification for the transaction information using the corresponding verification method; and
determining, based on a verification result, whether to complete the payment.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
determining, when a client application starts in a current running process, that a startup mode is a cold start; and
in response to determining that the startup mode is the cold start, displaying a start page comprising a payment digital object unique identifier (DOI) to be scanned by a scanner to make a payment by scanning the payment DOI, wherein, before determining that the startup mode is the cold start, pre-generating, by the client application in a previous running process, the start page comprising the payment DOI, and wherein displaying the start page comprising the payment DOI includes displaying the pre-generated start page comprising the payment DOI.

18. The computer-implemented system of claim 17, wherein the payment DOI comprises verification identifier information, and the verification identifier information is used by a server to determine a verification method for transaction information generated by the scanner after scanning the payment DOI.

19. The computer-implemented system of claim 17, wherein displaying the start page comprising the payment DOI comprises:

generating the payment DOI;

obtaining an initial start page of the client application that does not comprise the payment DOI; and generating and displaying, based on the payment DOI and the initial start page that does not comprise the payment DOI, the start page comprising the payment DOI.

20. The computer-implemented system of claim 19, wherein generating the payment DOI comprises:

generating the payment DOI based on local random factors.

21. The computer-implemented system of claim 20, wherein generating the payment DOI based on the local random factors comprises:

obtaining a user identifier that is previously used to log in to the client application; and generating the payment DOI based on the local random factors and the user identifier that is previously used to log in to the client application recently.

22. The computer-implemented system of claim 17, wherein after the client application has started, the operations further comprise:

determining that a prompt message indicating that the payment has failed is received; and in response, displaying a service page comprising the payment DOI, wherein the service page is not the start page.

23. The computer-implemented system of claim 17, wherein the payment DOI is a two-dimensional code.

24. The computer-implemented system of claim 17, wherein the operations further comprise:

receiving, by a server, transaction information generated by the scanner after scanning the payment DOI, wherein the payment DOI comprises verification identifier information;

determining a corresponding verification method for the transaction information based on the verification identifier information in the payment DOI;

performing a verification for the transaction information using the corresponding verification method; and determining, based on a verification result, whether to complete the payment.

\* \* \* \* \*